Figure 1:
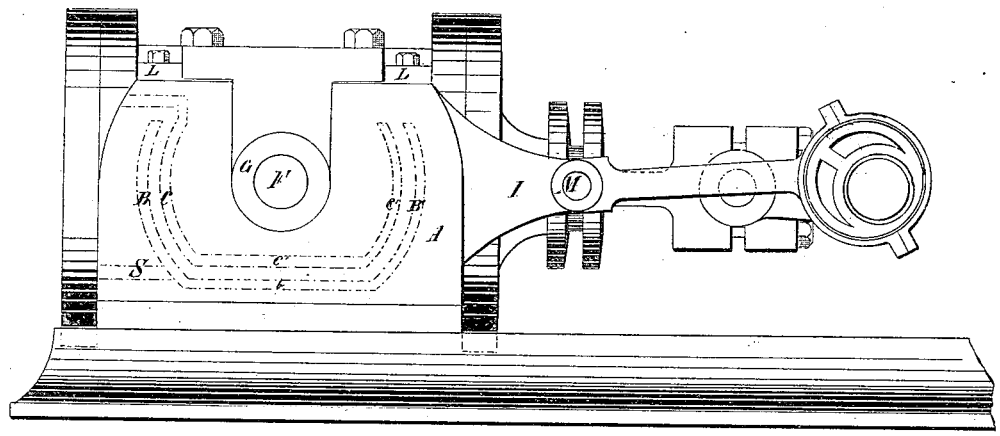

(No Model.)　　　　　　　　　　　　　　　　　2 Sheets—Sheet 1.

A. W. HARRISON.
VALVE FOR OSCILLATING ENGINES.

No. 271,449.　　　　　　　　　Patented Jan. 30, 1883.

Witnesses.
Harry Shipley
W. C. Chaffee

Inventor.
A. W. Harrison
By Philip T. Dodge
Atty.

(No Model.)
2 Sheets—Sheet 2.
A. W. HARRISON.
VALVE FOR OSCILLATING ENGINES.
No. 271,449.  Patented Jan. 30, 1883.
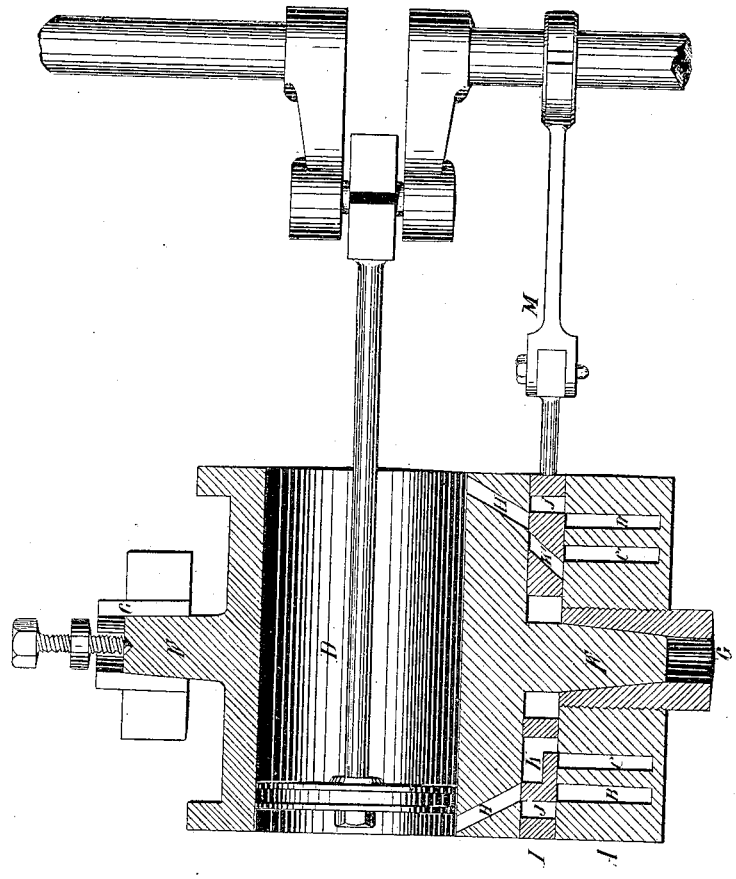
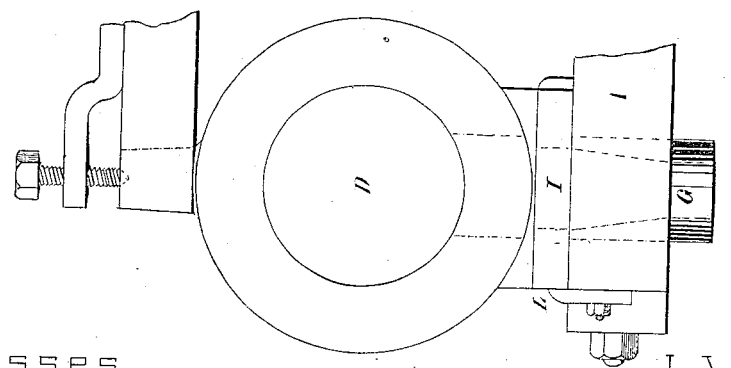
Witnesses
Harry Shipley
W. B. Chaffee
Inventor
A. W. Harrison
By Philip T. Dodge
Atty.

UNITED STATES PATENT OFFICE.

ABRAHAM WYKE HARRISON, OF ABERGAVENNY, COUNTY OF MONMOUTH, ENGLAND.

VALVE FOR OSCILLATING ENGINES.

SPECIFICATION forming part of Letters Patent No. 271,449, dated January 30, 1883.

Application filed August 2, 1882. (No model.) Patented in England March 9, 1882, No. 1,149, and in Belgium July 28, 1882, No. 58,601.

*To all whom it may concern:*

Be it known that I, ABRAHAM WYKE HARRISON, a subject of the Queen of Great Britain, residing at Abergavenny, in the county of Monmouth, in the Kingdom of England, have invented a new and useful Improvement in Valves for Oscillating Engines, (for which provisional protection has been applied for in England, No. 1,149, March 9, 1882;) and I do hereby declare that the following is a full, clear, and exact description of the construction and operation of the same.

This invention is designed for application to steam-engines, water-motors, pumps, and similar apparatus, in which the fluid is admitted or expelled from a cylinder through ports or openings controlled by the motion of a valve.

This invention has for its object a slide-valve apparatus that will require little power to move it, that will waste only a minimum amount of the fluid passing through the ports, that can be examined without difficulty, and that will be cheap and lasting.

In the drawings the invention is shown as applied to a simple form of steam-engine made to take the steam the full stroke; but it is equally applicable to compound engines working expansively. To water-motors the ports and passages should be made larger than those shown.

Figure 5:
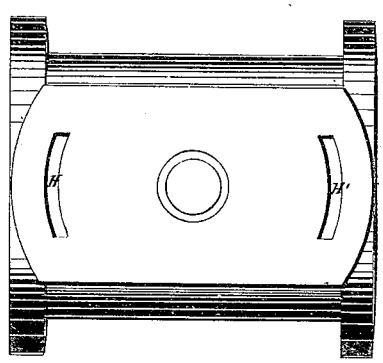
Figure 4:
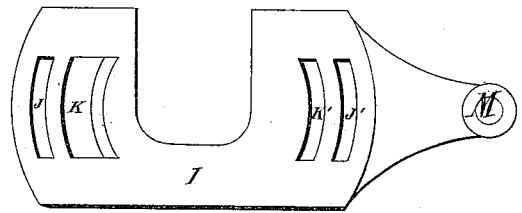
Figure 6:
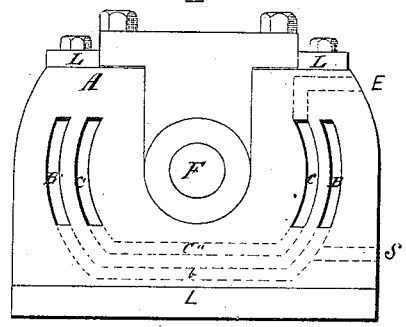

Figure 1 is a side elevation of cylinder of oscillating engine fitted with my invention. The passages in steam-chest are shown in dotted lines; Fig. 2, sectional plan of same, showing cylinder-ports and valve; Fig. 3, end elevation; Fig. 4, valve, showing face that works against the cylinder; Fig. 5, face of cylinder that works against the valve; Fig. 6, face of steam-chest that works against the valve.

Throughout the drawings similar letters of reference refer to like or corresponding parts shown in the several figures.

Referring especially to Figs. 1 to 6, inclusive, A is a steam-chest, somewhat C-shaped, so as to avoid the trunnions, and formed with steam-ports B B', preferably connected by passage *b*, and exhaust-ports C C', connected by passage C''. In either case, however, the ports could open into separate pipes, in which case the connecting-passages in the steam-chest can be dispensed with. This steam-chest is fixed and supplied with one or two, as the case may be, exhaust-pipes E and steam-pipes S. D is the cylinder, oscillating on solid trunnions F F; G, bearings for trunnions; H H', cylinder-ports, made nearly straight, and consequently having as little waste steam space as possible; I, slide-valve, also somewhat C-shaped, to avoid the trunnions, and pierced with steam-ports J J' and exhaust-ports K K'. This valve has a planed surface on each side, working against parallel planed surfaces on the cylinder and steam-chest. It will be seen that the ports are all curved, so as to accommodate themselves better to the oscillation of the cylinder. The port K is shown wider on the steam-cylinder side than on the side next the steam-chest, as this shape has been found to be more easy to mold than diagonal, as shown, K', though either will answer the purpose. The slide-valve works between guiding-lugs L L (shown in Fig. 3) on the steam-chest. It is worked by an eccentric on the main-shaft, link-motion, or other valve-gear linked to it at M. The bearing G of the trunnion is made conical, as shown, to take up any wear and tear; but, if desirable, ordinary bearings could be used.

The mode of action is so manifest to any one familiar with steam-cylinders and slide-valves that it is needless to describe it. It, however, differs in one remarkable point from other slide-valves, in that in the case of oscillating cylinders it has two motions relative to the cylinder—its own rectilinear reciprocating motion and the cylinder's oscillating motion. Through this circumstance it is found that, while other slide-valves and cylinder valve faces are apt to wear into grooves, mine wear uniformly—a great advantage. Another striking advantage of my valve is that on shutting off steam it can be at once unlinked from the eccentric and withdrawn and the faces and ports examined without disturbing any other part, whereas all other slide-valves that I know of are in steam-chests, and can only be got at by breaking the joint and taking off the steam-chest cover, after which, before the engine can be got to work, the joint must be remade steam-tight. Again, in oscillating engines the need of hollow trunnions, with all their expensive manufacture and complications, is avoided, while the trunnions, being solid and not heated by steam, can be made much smaller in diameter, and thus a great source of friction and of heated bearings is avoided. They can thus be made, too, to terminate in the bearings, and without other non-oscillating surface—such as steam-pipes—being attached.

I claim as my invention—

1. In an oscillating engine, the combination of a stationary steam-chest, A, and oscillating cylinder D, with valve I reciprocating between their faces, substantially as described.

2. In an oscillating-cylinder engine, the combination, with the trunnions F, of the bearing G, ports H H', valve I, cut away around the trunnion, and steam-chest, as described and shown.

3. The combination of the short cylinder-ports H H', wide apart, ports J and K, J' and K', in slide-valve, and corresponding ports, B C B' C', in the valve-chest, for the purposes described.

4. The flat reciprocating steam slide-valve I, formed of a plate with faces on each side, and perforated with steam-ports, and with an exhaust-port much wider on the side nearest the cylinder than on the other side.

5. The combination of the small solid trunnions F, conical bearings G, and stationary steam-chest A, supporting the bearings in a recess in the same.

6. The combination of the steam-cylinder, the exposed removable slide-valve, and the steam-chest provided with lugs, as described, to guide said valve and retain the same in an operative position.

7. The combination of the oscillating steam-cylinder, the slide-valve exposed at its edges and removable endwise, as described, and the steam-chest provided with lugs to guide said valve and retain the same in an operative position.

ABRAHAM W. HARRISON.

Witnesses:
 WM. P. THOMPSON,
 I. O. O'BRIEN.